S. Lewis,
Mat.
No. 108,160.   Patented Oct. 11. 1870.
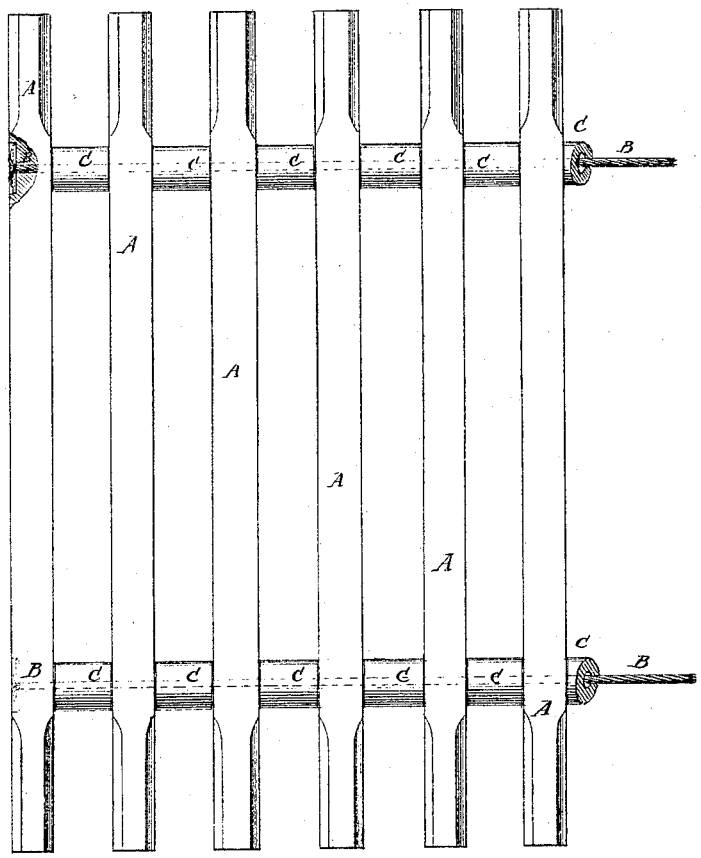
Witnesses:
A. W. Almquist
L. S. Mabee
Inventor:
S. Lewis
per Munn & Co
Attorneys

United States Patent Office.

SAMUEL LEWIS, OF WILLIAMSBURG, NEW YORK.

Letters Patent No. 108,160, dated October 11, 1870.

IMPROVEMENT IN MATS.

The Schedule referred to in these Letters Patent and making part of the same.

*To all whom it may concern:*

Be it known that I, SAMUEL LEWIS, of Williamsburg, in the county of Kings and State of New York, have invented a new and useful Improvement in Mats or Flexible Racks for Car-Floors, &c.; and I do hereby declare that the following is a full, clear, and exact description thereof, which will enable others skilled in the art to make and use the same, reference being had to the accompanying drawing forming part of this specification.

The figure is a top view of a portion of my improved mat, parts being broken away to show the construction.

My invention has for its object to furnish an improved mat or flexible rack, designed especially for application to street-car floors and other similar purposes, which shall be so constructed that it may be readily rolled up for transportation or storage, or to remove it from its place for sweeping and cleansing purposes; and It consists in the mat or rack constructed as hereinafter more fully described.

A are the cross-slats of the mat or rack, the length of which must depend upon the breadth of the car-floor, passage, or other place where the mat or rack is to be used.

The slats A have holes formed through them, through which are passed the wire cords B, upon which the said bars are strung.

Two or more wire cords B may be used, according to the length of the slats A.

The slats A are kept at the proper distance apart, and in their proper relative positions, by rubber blocks or short rubber tubes, C, placed upon the wire cords B, between the said slats A, as shown in fig. 1.

The rubber blocks C not only keep the slats A in their proper relative positions, but, by their elasticity, they increase the flexibility of the mat or rack.

When the mat or rack is bent or rolled, the rubber blocks C are compressed upon one side, and expand upon the other, so as to keep the slats A firmly in place, however closely or loosely the mat may be rolled, while, at the same time, making it very flexible, so that it may be rolled freely.

The ends of the wire cords that project at the outer sides of the outer slats A may be untwisted, and brushed or bent, and secured in place, by a drop of solder, a small metallic washer being used, if desired. Or the ends of the wires may be secured in any other convenient manner.

This construction gives great flexibility to the mat, so that it can be closely rolled without injury, and, at the same time, gives it great firmness when extended for use, keeping the slats A always in their proper relative positions.

Another advantage of this mat is, that, when one side has become worn, it may be turned over, it being immaterial which side is up.

By this construction, should one or more of the slats N be accidentally broken, the expansion of the rubber block C will be sufficient to take up the slack and keep the other slats securely in place.

Having thus described my invention,

I claim as new and desire to secure by Letters Patent—

An improved mat or flexible rack, formed by stringing the wooden slats A upon wire cords B, rubber blocks C being strung upon the said wire cords, and interposed between the said slats, substantially as herein shown and described.

SAMUEL LEWIS.

Witnesses:
   GEO. W. MABEE,
   JAMES T. GRAHAM.